United States Patent [19]
Bysouth et al.

[11] 3,763,769
[45] Oct. 9, 1973

[54] METHODS OF PRESSING CHEESE

[75] Inventors: Raymond Bysouth; Peter Struan Robertson, both of Palmerston North, New Zealand

[73] Assignee: New Zealand Dairy Research Institute, Fitzherbert West, Palmerston North, New Zealand

[22] Filed: June 28, 1971

[21] Appl. No.: 157,384

[52] U.S. Cl............ 100/37, 100/39, 100/41, 100/127, 100/137, 100/245, 100/247, 100/295
[51] Int. Cl.............................. B30b 9/02
[58] Field of Search............... 100/35, 37, 39, 98 R, 100/137, 295, 245, 126, 127, 41

[56] References Cited
UNITED STATES PATENTS

| | | | |
|---|---|---|---|
| 731,736 | 6/1903 | Anderson | 100/37 |
| 1,012,572 | 12/1911 | Simpson | 100/37 |
| 2,063,367 | 12/1936 | De La Roza | 100/37 X |
| 2,272,954 | 2/1942 | Sartori | 100/127 X |
| 2,492,878 | 12/1949 | Miollis | 100/37 X |
| 2,761,376 | 9/1956 | Cohen et al. | 100/37 |
| 2,830,104 | 4/1958 | Speckhardt et al. | 100/37 X |
| 2,845,857 | 8/1958 | Robertson et al. | 100/127 |
| 3,230,865 | 1/1966 | Hibbel et al. | 100/37 |

FOREIGN PATENTS OR APPLICATIONS

| | | | |
|---|---|---|---|
| 245,938 | 3/1966 | Austria | 100/127 |
| 899,477 | 8/1944 | France | 100/127 |

*Primary Examiner*—Billy J. Wilhite
*Attorney*—Holman & Stern

[57] ABSTRACT

A method of pressing curd to form cheese in which prepared divided curd is first pre-pressed for a period of time and under pressure to reduce the moisture content of the curd to a desired level, with this level being substantially the same as the moisture content of the finished cheeses. The pre-pressing is effected in a suitably perforated tunnel with a constricted outlet and the arrangement is such that expressed moisture excapes through the perforations of the tunnel. This pre-pressed curd may then be redivided and passed through a second pre-pressing stage or, alternatively, passed directly to a final press chamber, with this pressure chamber being hermetically sealable and held under vacuum pressure for a period of time during which mechanical pressure is applied to the curd to facilitate cohesion between the divided curd to form cheese. The vacuum pressure is released, and the mechanical pressure sustained for a longer period, preferably, overnight.

7 Claims, 12 Drawing Figures

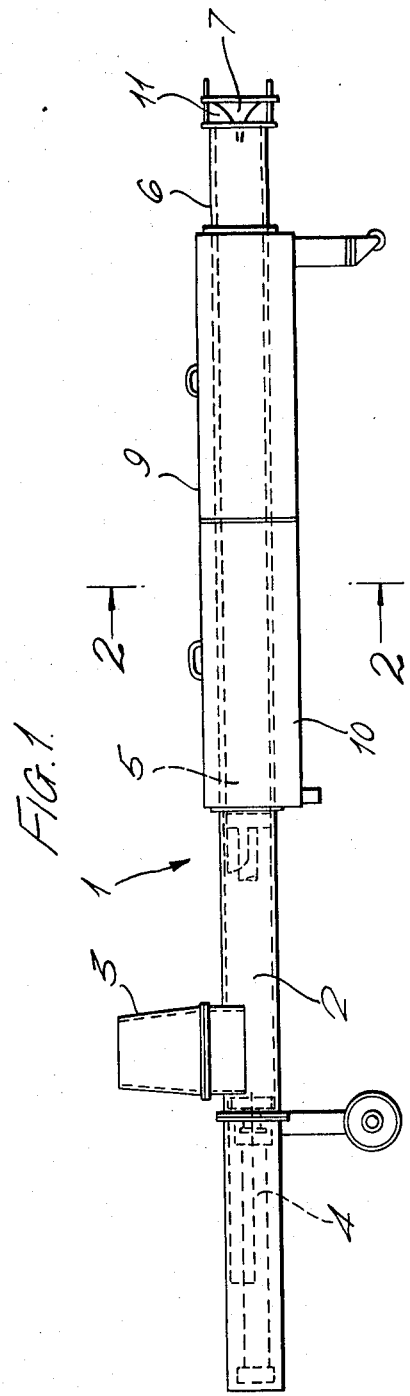

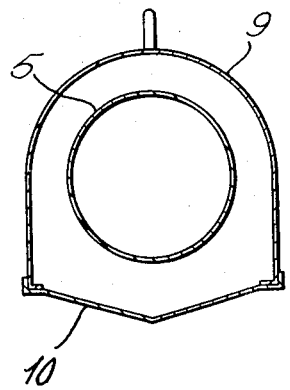
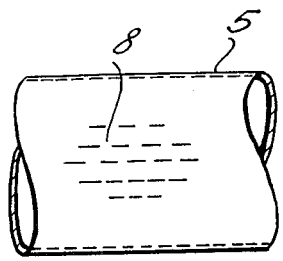
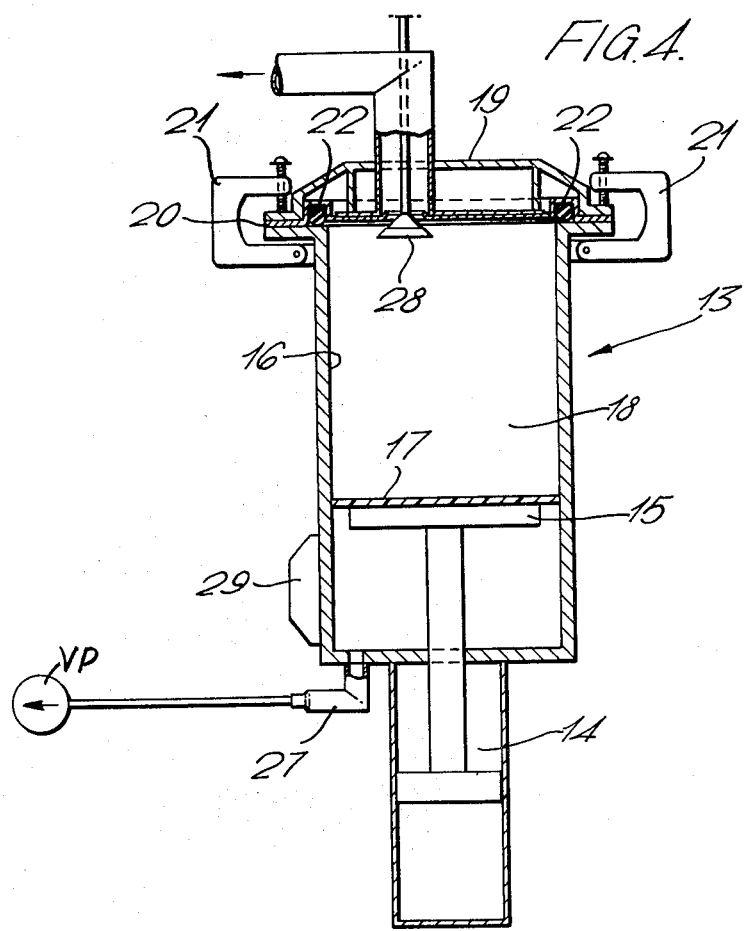

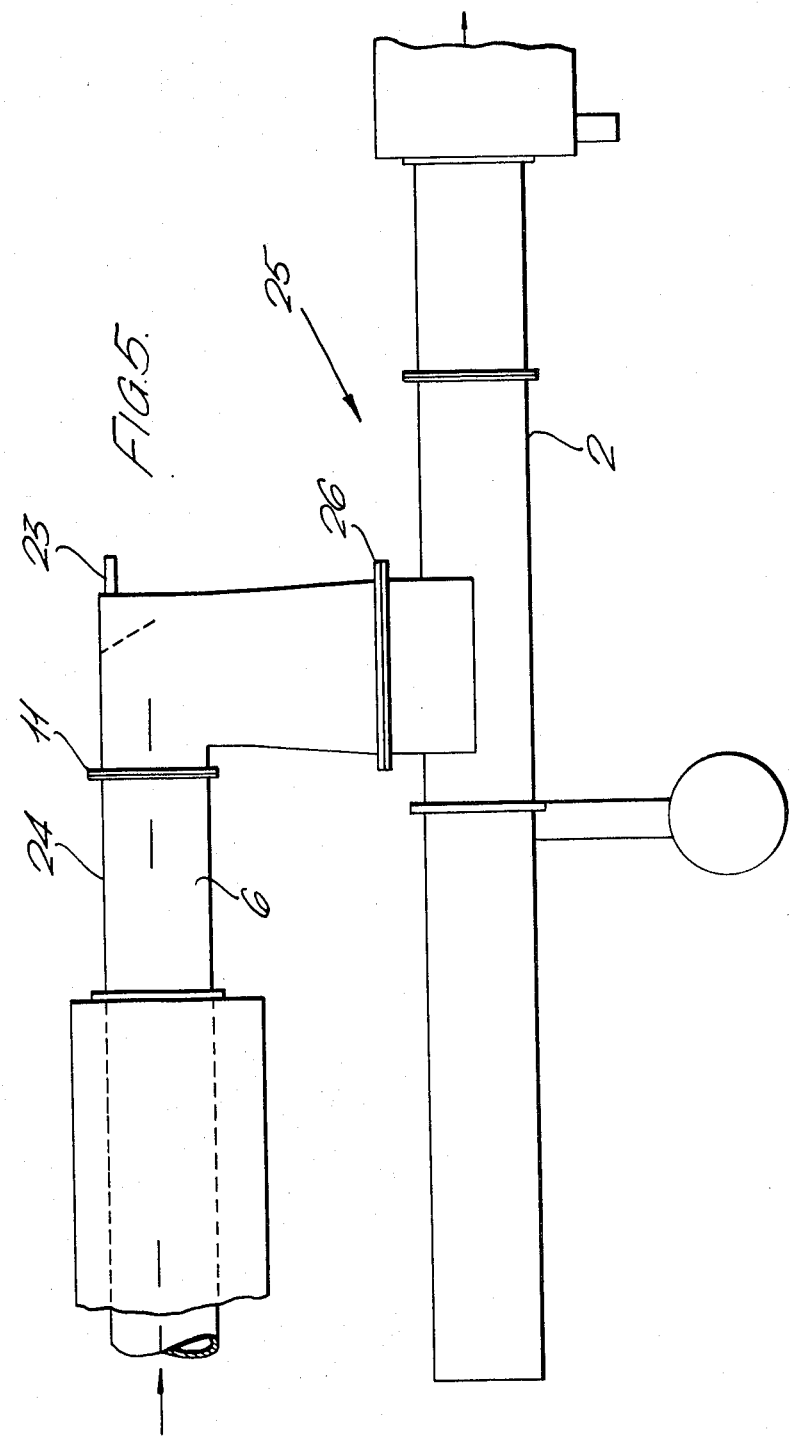

METHODS OF PRESSING CHEESE

BACKGROUND OF THE INVENTION

This invention relates to methods of pressing cheese.

PRIOR TECHNIQUES

It has been previously proposed to press cheese in what has been designated a "large hoop" press a 22 inch X 28 inch cross section and having a working depth of 6 to 10 feed, the pressing chamber being operated under vacuum, and the pressing being effected by an hydraulic ram with provision for drainage of excessive whey from the pressure chamber during pressure. This construction has been found to be satisfactory in use, but somewhat expensive to manufacture because of the difficulties brought about by providing drainage facilities on the walls of the chamber relative to which movement of the ram plate takes place. In such constructions, these walls are manufactured of a dimpled stainless steel sheet, a perforated stainless steel sleeve, a perforated plastic sheet and/or dacron cloth, and of course, provision must be made in the bottom of the pressing chamber whereby expressed whey may be bled off from the chamber. A further slight disadvantage is that during pressing, since the quantity of whey expressed is not always constant, there are some slight variations in the specific gravity and moisture content of the blocks of cheese cut from the bulk pressed cheese.

OBJECTS AND SUMMARY OF THE INVENTION

Accordingly, it is an object of the present invention to provide a method of pressing cheese which will obviate or minimize the foregoing disadvantages in a simple yet effective manner, or which will at least provide the public with a useful choice.

Accordingly, the invention consists in a method of pressing curd to form cheese, comprising the steps of first pre-pressing prepared divided curd for a period of time and under a pressure such as to reduce the moisture content of the curd to a desired level, releasing the pre-pressed curd from such pressure, partially redividing the curd when and as appropriate, passing the redivided curd to a press chamber adapted to be substantially hermetically sealed, reducing the gaseous pressure within the chamber to below atmospheric pressure, applying pressure to the curd to a desired pressure in order to facilitate coherence between the divided curd to form cheese and subsequently expressing the cheese from said hermetically sealed chamber, with said cheese having substantially the same moisture content as that of the pre-pressed curd from which it is formed.

BRIEF DESCRIPTION OF THE DRAWINGS

Preferred forms of the invention will now be described with reference to the accompanying drawings in which:

FIG. 1 is a view in side elevation of a pre-press according to the invention;

FIG. 2 is a view taken along line 2—2 of FIG. 1, the view looking in the direction of the arrows;

FIG. 3 is a fragmentary view of the tunnel section in FIG. 1;

FIG. 4 is a view partly in elevation and partly in section of a secondary press of the invention;

FIG. 5 is a schematic view of a two-stage pre-press arrangement of the invention;

DETAILED DESCRIPTION OF THE INVENTION

Figure 6:
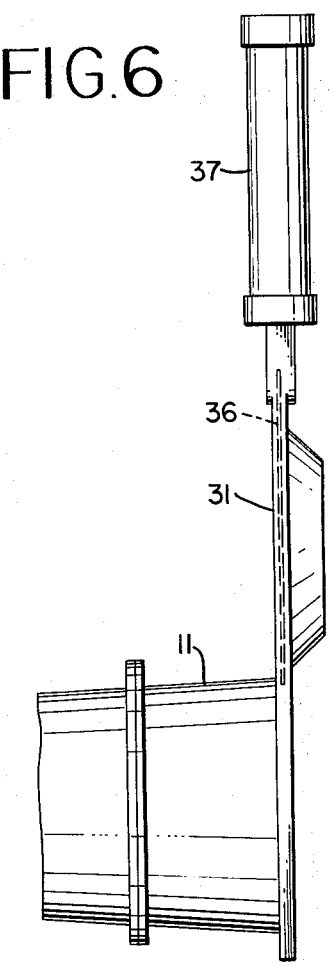
FIG. 6 is a view in side elevation of a plate mounted on the tunnel and constituting the back pressure arrangement.
Figure 7:
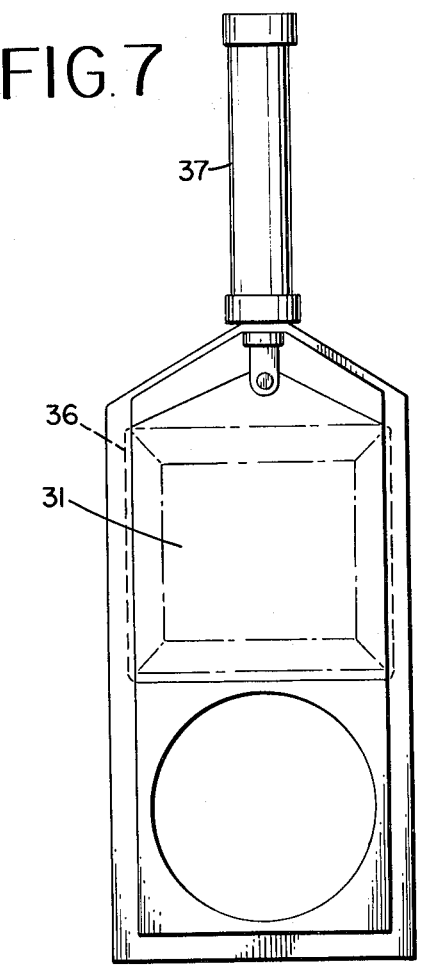
FIG. 7 is an end view of the plate shown in FIG. 6.
Figure 8:
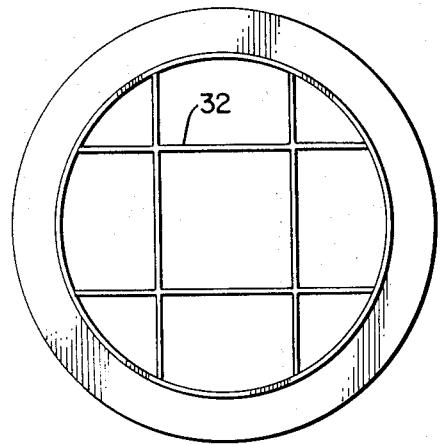
FIG. 8 is an end view of a grid for the tunnel, with the grid constituting the back pressure arrangement.
Figure 9:
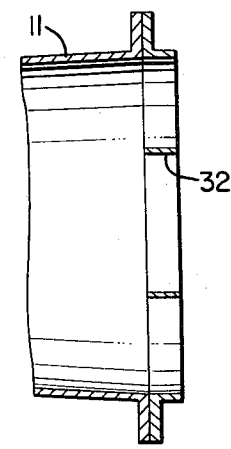
FIG. 9 is a view in side elevation of the grid shown in FIG. 8.

As illustrated in FIG. 1, a first or pre-press denoted generally 1 comprises a tunnel 2 preferably of circular cross section, and this tunnel 2 is provided with a feed inlet 3 for example a hopper, and a reciprocable ram 4 which can pass from one end of the feed hopper 3 to the other, with the tunnel 2 continuing beyond the feed hopper 3 and the maximum ram extension. Divided curd of usual form is fed through tunnel extensions 5 and 6 by the reciprocating action of the ram 4 towards a backing cone, 7 plate 31 (FIG. 6) or grid 32 (FIG. 8) of sharpened knives. The tunnel extension 5 is provided with numerous narrow longitudinal drainage slots 8 and a friction reducing surface coating such as polytetrafluoroethylene. However, any suitable preliminary press means may be provided, for example, a tunnel extension may be provided having one or more walls diverging towards the opposite wall so that again, the friction of the curd passing through the tapering tunnel may cause a resistance to the pressure of the ram so that the curd itself is under suitable pressure. Such one or more walls may, of course, be permanently diverging at a suitable angle such as wall 33 in FIG. 10, or the wall or walls may be mounted so as to be movable such as wall 34 in FIG. 11, and side pressure applied, for example, by hydraulic rams such as ram 35 on the wall to the column of the curd to provide the pressure.

Figure 10:
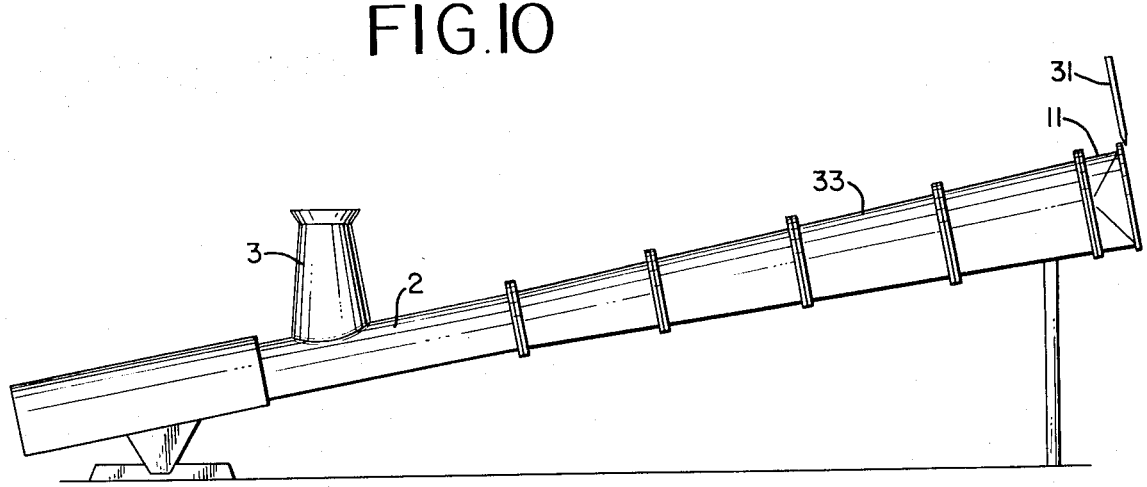
FIG. 10 is a view in side elevation of a diverging tunnel arrangement.
Figure 11:
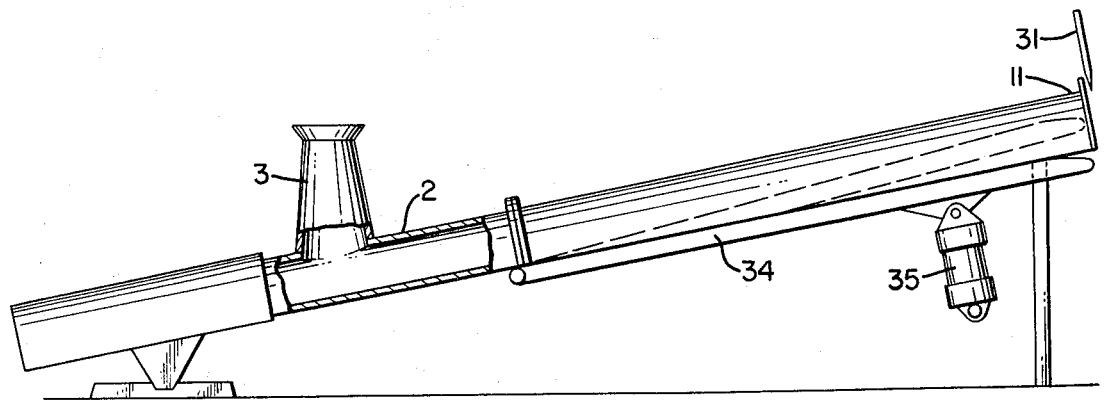
FIG. 11 is a view in side elevation of a tunnel arrangement having a movable wall.
Figure 12:
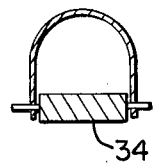
FIG. 12 is a view in cross section of the tunnel shown in FIG. 11.

Alternatively, the walls of the tunnel may diverge at a further suitable but greater angle than that shown in FIG. 10 to reduce or eliminate wall friction, and the necessary back-pressure to effect the desired moisture expulsion is provided by the construction of the discharge cone 7, plate 31 or grid 32 of sharpened knives.

The tunnel extension 5 is provided with outer cover plates 9 and drainage ways 10 for drainage of the excess moisture expelled during the pressing operation.

Between the tunnel extension 6 and the back-pressure arrangement defined by the cone 7 is an annular outlet 11. The back-pressure arrangement can be in several forms according to the degree of teasing or crumbling required, for example, the cone 7 mounted on a flange, with the flange being spaceably mounted so that the point of the cone lies on the central axis of the annular outlet 11. The sides of the cone near its base are concave to provide a smooth transition between the cone and its mounting flange. In use, the cone partially re-crumbles the curd. Where the curd is of a type that crumbles easily, a plain plate 31 can be used to provide back-pressure by suitable adjustment of the plate 31 in guides 36 by a ram 37. On the other hand, where the curd is very firm and wall friction high, as can happen when too much salt has been applied, the curd can be substantially redivided by securing the simple grid 32 formed from a few sharp knives over the annular outlet 11 in place of the cone shown in FIG. 1.

The annular outlet 11 of the pre-press 1 described above delivers the redivided curd to a second press 13 (FIG. 4) comprising a bulk press having an hermetically sealable container 18 of dimensions similar to the "Large hoop" presses at present in operation, and thus the pre-press acts as a conveyor, and the container 18 is disposed vertically with a horizontal cross section of, for example, 22 inches × 28 inches and a usable depth of six or more feet. Such a container is provided with a ram 14 and a ram plate 15, with vertical walls 16 of the container 18 being coated with a suitable low friction material relative to the cheese or curd. It has been found that a suitable material is polypropylene sheet, for example, about 1 millimeter thick Alternatively the inner surface of the chamber 18 could be coated with a polytetra fluoroethylene coating such as that sold under the trade mark TEFLON. The ram plate 15 is coated with a resilient material 17 for example neoprene, the intention being that a suitable thickness of material, for example, three eighths of an inch, is provided so that under pressure the neoprene sheet 17 spreads and contacts the vertical wall 16 of the container 18 to provide a substantially hermetic sealing suitable to the pressure in use. Alternatively, a more conventional design of piston seal may be used for the object stated. The container 18 is provided with a removable lid 19 which may be fitted in place with a suitable gasket 20 and clamped with clamps 21 and, if desired, a rubber tube seal 22 may be provided around the lid 19. This lid 19 is suitably strengthened as is the container 18, to resist the pressures in use against it. A pressure reducing means is provided comprising a pipe 27 connected to a vacuum pump (vp) adapted to suitably reduce the pressure within the chamber below atmospheric pressure, e.g., a vacuum of 25 inches of mercury. The ram plate 15 is operated, for example, by the hydraulic ram 14 to apply mechanical pressure to curd placed between the ram plate 15 and the lid 19, and this pressure is such that a pressure of about 60 to 100 pounds per square inch is applied to the curd. The press 13 is provided with a cleaning manhole 29. This is positioned so that with the plate 15 in one position, access may be obtained above the plate 15 and in another position of the piston, below the plate 15.

In a further aspect, of the invention, it may be considered desirable when curd is of a high moisture content or of a type from which it is difficult to remove moisture content, to provide two prepressing stages. Referring to FIG. 5, a stage one prepress is provided constructed in accordance with the foregoing description. The outlet of this stage on prepress 24 is connected directly to an input hopper 23 of a stage two prepress 25, and the input hopper 23 is hermetically sealed between the outlet 11 of the stage one prepress 24 and inlet flange 26 of the stage two prepress 25. A pressure reducing means is provided comprising a vacuum pump adapted to suit the reduced pressure within the tunnel extension 6 of the stage one prepress 24, the inlet hopper 23 and the tunnel 2 of the stage two prepress 25.

The operation of the construction is as follows: Suitably, prepared curd, for example, curd which has passed through a curd mill, and cut into "fingers" about 2 to 8 inches long by one half to three quarters of an inch square and salted to the desired degree, is passed to the inlet 3 of the first press means. The automatically reciprocating ram 4 then pushes successive "bites" of the curd fingers forward until after a number of strokes it pushes the first curd to enter against the cone 7 pushing the curd through the tunnel extensions 5 and 6 in the process. The restriction of the cone 7 plus the wall friction develops a substantially predetermined and adjustable pressure and when this build up of pressure is adequate, it is known to reduce the moisture content of the curd to a substantially predetermined degree which is the moisture content required in the final cheese by the escape of liquid through the multiplicity of narrow longitudinal slots 8 incorporated in the walls of the tunnel extension 5. This curd is pushed by the ram 4 past the cone 7 which disrupts and at least partially redivides the partially consolidated mass of curd as it discharges through the annular outlet 11. If further breaking up of the curd appears desirable, it may be further redivided by, for example, passing a knife or knives around the outlet 11. The redivided curd is delivered either to a stage two pre-press or to the container 18 and the ram 14 in the final press 13. The ram 14 being, of course, at or near the bottom of the container 18. When the container 18 is full of curd, the flow of curd to the container 18 is stopped, the lid 19 is placed on the container 18 and reduced gaseous pressure applied by the vacuum pump to the interior of the container 18 via pipe or passage 27 and via a cap valve 28 in the lid 19 or the upper wall and the mechanical pressure applied to the curd by the ram 14. The ram 14 raises the curd against the lid and pushes the cap valve 28 similar to a large gas engine exhaust valve closed, thus preventing escape of cheese curd to the vacuum line. Alternatively, the valve may be closed manually or automatically during or before operation of the ram 14. These conditions are now left in operation for a period of time, for example, the vacuum is left on for a quarter of an hour before the pressure is applied overnight, and during this latter period, this curd is consolidated into cheese, but virtually no further moisture is expressed from the cheese. Hence, the moisture content of the final cheese is substantially determined by the moisture content of the final pressed curd. At this first pre-pressing stage, adequate control can be maintained over such moisture content by varying the through put and pressure applied which regulate expression of moisture during that process and, consequently, the relationship between the weight of cheese and the volume thereof is substantially constant.

The advantages of this are considerable. At present, the maintenance of an exact weight of, for example, forty pounds two ounces is somewhat difficult, even with the more sophisticated processes at present in use. Consequently, weighing of the cheese and some paring of the cheese to reduce excess weight takes place which, of course, is time consuming and, therefore, expensive. Furthermore, the apparatus has considerable advantages over the present "large hoop" presses, in that no provision is necessary in the hermetically sealable container for the expression of whey from cheese. The "large hoop" presses require a very sophisticated wall system comprising a dimpled stainless steel sheet, a perforated stainless steel sleeve over that sheet, and perforated plastic sheet over the stainless steel sheet. The formation of the dimpled sheet and the perforating of the stainless steel requires considerable labor and consequent expense and consumption of time during manufacture.

The present device, in a very simple manner, therefore, reduces both the disadvantages of some variation of weight and provides an apparatus which is reduced in cost compared with the present construction. In addition, the adjustment of moisture in a separate pre-pressing device which can feed a multiplicity of simplified "large hoops" increases the uniformity of the moisture distribution within the bulk cheese mass, by eliminating the necessity for drainage within the "large hoop," the depth and hence the capacity of each bulk presser can be substantially increased, and as a consequence of reduced wall friction through the elimination of the multitude of perforations in the lining material. An increase in capacity reduces floor space requirements and equipment cost per unit volume of bulk press cheese.

We claim:

1. A method of pressing curd to form cheese, comprising the steps of first pre-pressing prepared divided curd for a period of time and under a pressure to reduce the moisture content of the curd to a desired level, releasing the pre-pressed curd from such pressure, partially redividing the curd, passing the curd to a hermetically sealed press chamber, reducing the gaseous pressure within the chamber to below atmospheric pressure, applying mechanical pressure to the curd to a desired pressure to facilitate coherence between the divided curd to form cheese and, subsequently expressing the cheese from said hermetically sealed chamber so that the cheese has substantially the same moisture content as that of the pre-pressed curd from which it is formed.

2. The method of pressing curd to form cheese as claimed in claim 1 wherein said pre-pressing of the curd is effected by pressing the curd in a tunnel having slots for drainage, against the back pressure offered by a restricted discharge outlet causing moisture to be expressed from the curd into said drainage slots.

3. The method of pressing curd to form cheese as claimed in claim 1, including pressing the curd through a tunnel by a pressing ram, said tunnel having one or more walls diverging towards an opposite wall, so that the curd passes from a cross section of greater area to a cross section of lesser area.

4. The method of pressing curd to form cheese as claimed in claim 1 including the steps of effecting said final pressing of the pre-pressed curd in a chamber, hermetically sealing said chamber, reducing the pressure within the chamber to below atmospheric pressure, and pressing the curd within the chamber by moving at least one wall of said chamber to form cheese.

5. The method as claimed in claim 1 including the step of carrying out said pre-pressing in two stages.

6. The method as claimed in claim 5 wherein the curd is at least partially redivided between said two stages.

7. The method of pressing curd to form cheese as claimed in claim 1, including pressing the curd through a tunnel by a pressing means, said tunnel having a movable wall diverging towards an opposite wall so that the curd passes from a cross section of greater area to a cross section of lesser area.

* * * * *